J. O. HOGMIRE.
BEAN HARVESTER ATTACHMENT FOR PLOWS.
No. 174,677. Patented March 14, 1876.
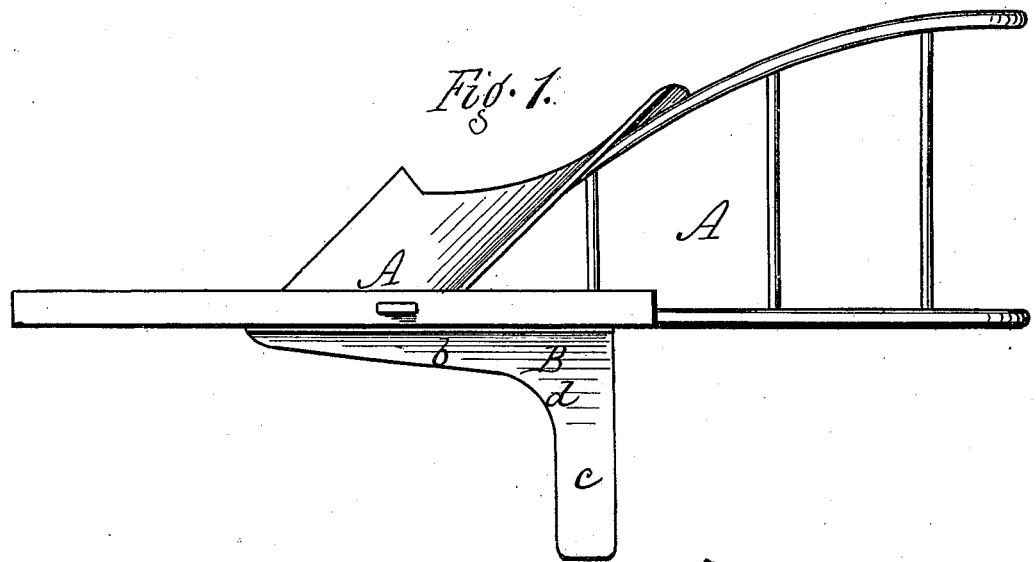
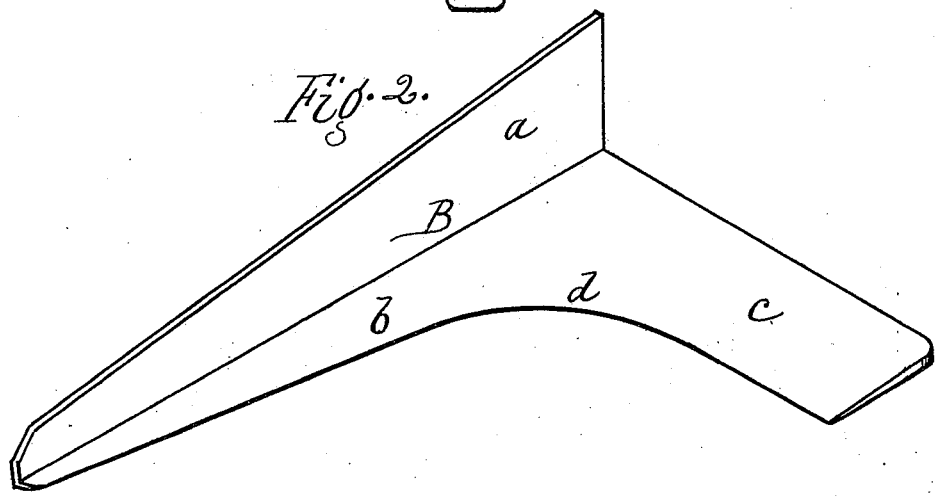
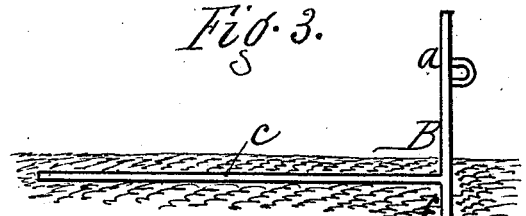
Witnesses.
E. B. Scott
Louis D. Fahn
Inventor.
Jonas O. Hogmire,
pr R. F. Osgood,
Atty.

UNITED STATES PATENT OFFICE.

JONAS O. HOGMIRE, OF SOUTH AVON, NEW YORK.

IMPROVEMENT IN BEAN-HARVESTER ATTACHMENTS FOR PLOWS.

Specification forming part of Letters Patent No. 174,677, dated March 14, 1876; application filed February 4, 1876.

*To all whom it may concern:*

Be it known that I, JONAS O. HOGMIRE, of South Avon, in the county of Livingston and State of New York, have invented a certain new and useful Improvement in Bean-Harvester Attachment for Plows; and I do hereby declare that the following is a full, clear, and exact description of the construction and operation of the same, reference being had to the accompanying drawings, in which—

Figure 1 is a plan of a plow provided with my improvement. Fig. 2 is a perspective view of the attachment removed from place. Fig. 3 is a rear elevation of the same.

This improvement relates to an attachment for the land-side of a plow, and is designed to be flat and pass under the row of beans and cut the roots without throwing the beans over or out of the ground, thereby avoiding the shattering and shelling of the beans which occur where they are thrown up by an inclined share or wing raised at the rear.

The invention consists of a right-angled metallic plate attached to the land-side, lying perfectly flat or horizontal, to run under the beans without disturbing them, and formed on the cutting side with a gradually-increasing tapered blade, concave at its junction with the wing, whereby the roots of the beans and all grasses and weeds will be gradually crowded to the center of the hills in best condition for being cut by the wing without clogging, as hereinafter described.

A represents an ordinary field-plow. B is the attachment for harvesting the beans. The mold-board of the plow is not removed for this purpose, but is used running between the rows of beans, and serves as an anchor or guide to prevent running off from the work, though, in itself, it serves no other purpose. The attachment B is fitted to the land-side, taking the place of the ordinary false land-side plate, and being secured by the usual staple and key. It is of right-angled form —the vertical web *a* fitting the land-side, while the horizontal part *b* forms the blade or crowding edge, and at the rear is a right-angled wing, *c*, which is thin and runs under the hills of beans. The blade and wing *b c* are perfectly flat, so that in running under the hills the roots will be simply cut or divided without raising the beans from their place or throwing them over. This flat portion of the blade and wing is absolutely necessary, since any incline or rise at the rear of the attachment will raise the beans up out from the dirt and throw them over and subject them to much violence, thereby shattering and shelling them from the pods.

Another important feature of this attachment is, that the blade *b* gradually increases in width from front to rear, and at its junction with the wing *c* it forms a regular half-circle or concave, (shown at *d*.) The effect of this incline and concave is to press up gradually toward the center of the hills from point to base, thereby crowding the roots to that line, and cutting off gradually all grasses and weeds and roots, up to the very center of the hills, before the wing *c* cuts under the hills. By this means there is the least resistance to the cutter as it passes under the hills, and no clogging occurs, and the beans are left standing in their places after the plow has passed, the same as before. The cut from the point to the heel is so gradual that no clogging can occur. Where a square wing is used, the spreading of the roots over so large a surface, coming in contact with the square or right-angled cutter, renders them liable to roll up and gather in front of the wing and tear the beans from place by clogging; and where a simple inclined blade alone is used, standing at a backward angle, it is liable to push the beans away to one side and force them out of the ground.

The rear end of the attachment has a vertical flange, *f*, projecting downward, which runs in the soil and serves as a guide to keep the attachment centered and in place.

Beans thus harvested are subjected to the least possible violence, as they are not thrown out of the soil. If ripe, they will not be shattered. One important advantage resulting from this method of harvesting is, that after being cut the beans can be allowed to stand for curing, or for further ripening, if green. They cure and ripen in this condition much better than when removed from the ground, and when in just the right condition they can be removed and stacked without the danger that would occur if they were allowed to get ripe or dry before being pulled. In gathering the beans after being cut, they can be removed with great facility with hand or by a fork.

Having thus described my invention, I do not claim, broadly, a blade running under the hills, as I am aware the same is not new; but I claim—

The attachment B, constructed with an inclined blade, b, and right-angled wing c, the blade widening from point to heel, and joining with the wing by a concave, d, in the manner and for the purpose specified.

In witness whereof I have hereunto signed my name in the presence of two subscribing witnesses.

JONAS O. HOGMIRE.

Witnesses:
  B. F. Dow,
  H. H. Cranson.